United States Patent
Ichii

(10) Patent No.: US 10,962,767 B2
(45) Date of Patent: Mar. 30, 2021

(54) OPTICAL SCANNING DEVICE, IMAGE DISPLAY APPARATUS, AND MOVABLE OBJECT

(71) Applicant: Ricoh Company, Ltd., Tokyo (JP)

(72) Inventor: Daisuke Ichii, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/269,604

(22) Filed: Feb. 7, 2019

(65) Prior Publication Data

US 2019/0285875 A1    Sep. 19, 2019

(30) Foreign Application Priority Data

Mar. 19, 2018    (JP) .............................. JP2018-050427

(51) Int. Cl.
G02B 26/10    (2006.01)
G02B 26/08    (2006.01)
(Continued)

(52) U.S. Cl.
CPC ......... *G02B 26/10* (2013.01); *G02B 26/0833* (2013.01); *G02B 27/0031* (2013.01);
(Continued)

(58) Field of Classification Search
CPC .............. B60K 2370/334; B60K 35/00; G02B 2027/0112; G02B 2027/0118;
(Continued)

(56) References Cited

U.S. PATENT DOCUMENTS

2003/0137580 A1 *    7/2003    Sumi ................. H04N 1/00018
                                                                347/243
2004/0240017 A1 *    12/2004    Kandori ............. G02B 26/0816
                                                                359/196.1
(Continued)

FOREIGN PATENT DOCUMENTS

CN         106052592 A    * 10/2016
JP         2003-270563 A    9/2003
(Continued)

OTHER PUBLICATIONS

Fukuda et al., Translation of WO 2014162415, Oct. 9, 2014 (Year: 2014).*

(Continued)

*Primary Examiner* — Dmitriy Bolotin
(74) *Attorney, Agent, or Firm* — Xsensus LLP

(57) ABSTRACT

An optical scanning device includes a plurality of light sources, a light deflector, a light receiver, and circuitry. The light deflector scans light emitted from the plurality of light sources on a surface to be scanned. The light receiver receives light emitted from at least one of the light sources, at a predetermined timing. The circuitry adjusts a scanning position of the light deflector based on a timing at which the light receiver receives the light. The circuitry turns on at least one of the plurality of light sources that emits light having a wavelength of 600 [nm] or and causes the light receiver to receive the light at the predetermined timing.

20 Claims, 5 Drawing Sheets

(51) Int. Cl.
*G02B 27/01* (2006.01)
*G02B 27/00* (2006.01)
*B60K 35/00* (2006.01)

(52) U.S. Cl.
CPC .......... *G02B 27/0101* (2013.01); *B60K 35/00* (2013.01); *B60K 2370/334* (2019.05); *G02B 2027/0112* (2013.01); *G02B 2027/0118* (2013.01); *G02B 2027/0154* (2013.01)

(58) Field of Classification Search
CPC ........ G02B 2027/0154; G02B 26/0833; G02B 26/10; G02B 27/0031; G02B 27/0101
See application file for complete search history.

(56) References Cited

U.S. PATENT DOCUMENTS

| | | | |
|---|---|---|---|
| 2011/0298695 A1 | 12/2011 | Hajjar et al. | |
| 2016/0167514 A1* | 6/2016 | Nishizaki | B60K 35/00 345/7 |
| 2016/0255319 A1* | 9/2016 | Miyamoto | H04N 9/3164 348/602 |
| 2016/0313562 A1* | 10/2016 | Saisho | G02B 27/0179 |
| 2016/0334637 A1 | 11/2016 | Saisho et al. | |
| 2018/0067308 A1* | 3/2018 | Sakai | G02B 27/0101 |
| 2018/0070062 A1 | 3/2018 | Shitomi | |
| 2018/0143446 A1* | 5/2018 | Nakamura | G09G 3/02 |
| 2018/0231767 A1* | 8/2018 | Kimura | G02B 26/10 |
| 2018/0252916 A1 | 9/2018 | Nakamura et al. | |
| 2019/0097396 A1* | 3/2019 | Sakai | H01S 5/06804 |

FOREIGN PATENT DOCUMENTS

| | | | |
|---|---|---|---|
| JP | 2015-031782 | 2/2015 | |
| JP | 6155943 B2 | 7/2017 | |
| WO | 2014/162415 A1 | 10/2014 | |
| WO | 2014/162506 A1 | 10/2014 | |
| WO | WO-2014162415 A1 * | 10/2014 | ............. H04N 9/317 |

OTHER PUBLICATIONS

You et al., Translation of CN 106052592, Oct. 26, 2016 (Year: 2016).*
European Search Report dated Jul. 30, 2019, in corresponding European Application No. 19153583.0, 7 pages.
European Office Action dated May 27, 2020, issued in corresponding European Patent Application No. 19153583.0, 5 pages.

* cited by examiner

OPTICAL SCANNING DEVICE, IMAGE DISPLAY APPARATUS, AND MOVABLE OBJECT

CROSS-REFERENCE TO RELATED APPLICATIONS

This patent application is based on and claims priority pursuant to 35 U.S.C. § 119(a) to Japanese Patent Application No. 2018-050427, filed on Mar. 19, 2018, in the Japan Patent Office, the entire disclosure of which is hereby incorporated by reference herein.

BACKGROUND

Technical Field

The present invention relates to an optical scanning device, an image display apparatus, and a movable object.

Discussion of the Background Art

A conventional optical scanning device adjusts a scanning position on the basis of a timing at which a light receiver receives light emitted from at least one light source, while optically scanning with light emitted from a plurality of light sources. There is also an image display apparatus using such an optical scanning device.

For example, an image display apparatus disclosed in JP-6155943-B deflects red (R) light, green (G) light, and blue (B) light emitted from each of an R light source, a G light source, and a B light source by a vibration mirror to cause the light to serve as scanning light. Then, a surface to be scanned such as a screen is optically scanned by the scanning light, and an image is displayed on the surface to be scanned. Any one of these light sources is selected, the timing at which the light reflected by a vibration mirror should be directed to a light receiving element in the apparatus is predicted, the light source is turned on for a short time including the timing to cause the light receiving element to receive light. Thereafter, a scanning position is adjusted on the basis of the timing at which the light receiving element actually receives light. Such a configuration can suppress displacement of the image due to characteristic change of the vibration mirror due to temperature change.

However, in this image display apparatus, light to be received by the light receiving element is diffusely reflected in the apparatus, and mixed with the scanning light as stray light, which may cause image noise.

SUMMARY

Example embodiments include an optical scanning device includes a plurality of light sources, a light deflector, a light receiver, and circuitry. The light deflector scans light emitted from the plurality of light sources on a surface to be scanned. The light receiver receives light emitted from at least one of the light sources, at a predetermined timing. The circuitry adjusts a scanning position of the light deflector based on the timing at which the light receiver receives the light. The circuitry turns on at least one of the light sources that emits light having a wavelength of 600 [nm] or more and causes the light receiver to receive the light at the predetermined timing.

Other example embodiments include an image display apparatus including the above-described optical device, and a movable object on which the image display apparatus is mounted.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
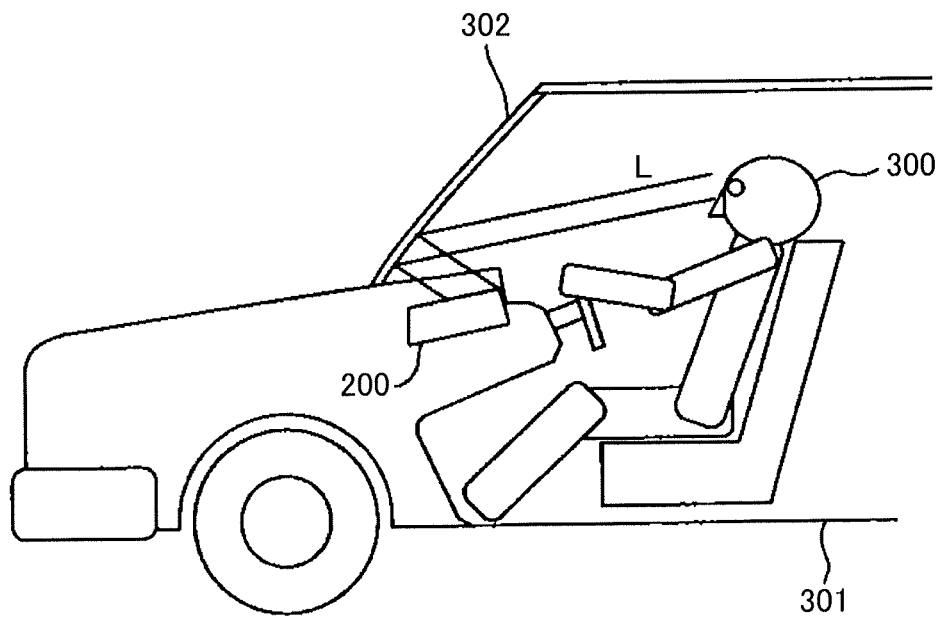
FIG. 1 is a schematic diagram schematically showing a configuration of an automobile equipped with an optical scanning device according to an embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, an embodiment of an optical scanning device to which the present invention is applied, a head-up display (hereinafter, referred to as HUD) which is an example of an image display apparatus, and an automobile which is an example of a movable object will be described. The scope of application of the present invention is not limited to the embodiments described below. The present invention can also be applied as an optical scanning device of an image display apparatus equipped in a movable object such as a vehicle, a ship, an aircraft, or a mobile robot, or a non-movable object such as a work robot for operating a driven object such as a manipulator without moving from the place.

Figure 2:
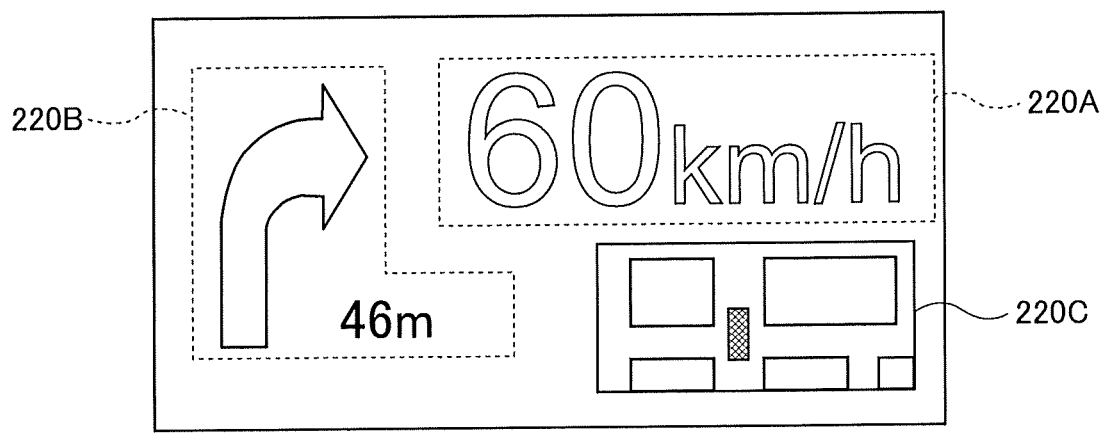
FIG. 2 is a schematic diagram schematically showing an example of an image displayed by the optical scanning device of FIG. 1.

First, a basic configuration of an automobile or the like according to an embodiment will be described. FIG. 1 is a schematic diagram schematically showing a configuration of an automobile equipped with an optical scanning device 200 according to an embodiment. The optical scanning device 200 is installed, for example, in a dashboard of an automobile 301. Projection light L (scanning light L2 described later), which is an image light emitted from the optical scanning device 200 in a dashboard, is reflected by a windshield 302 and heads toward an observer (a driver 300) which is a user. As a result, the driver 300 can visually recognize, for example, a navigation image as shown in FIG. 2 as a virtual image. A combiner may be installed on an inner wall surface of the windshield 302 and the user may visually recognize the virtual image by the projection light L reflected by the combiner.

The speed of the automobile 301 (image of "60 km/h" in the illustrated example) is displayed in a first display region 220A, in a navigation image shown in FIG. 2. A navigation image by a car navigation device is displayed in a second display region 220B. In the illustrated example, a right turn instruction image indicating a direction turning at the next corner and an image of "46 m" indicating the distance to the next corner are displayed as navigation images. A map image by the car navigation device (a map image in the periphery of own vehicle) is displayed in a third display region 220C.

Figure 3:
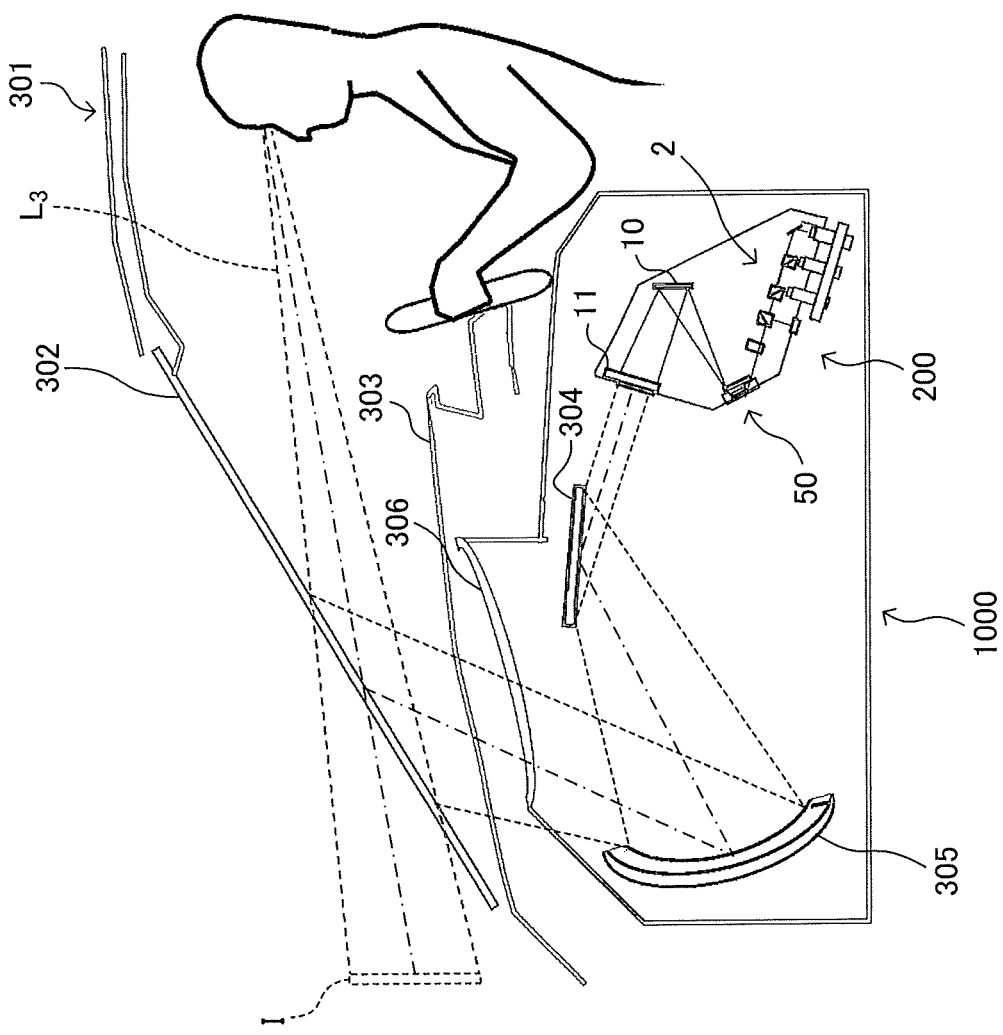
FIG. 3 is a schematic configuration diagram showing a head-up display (HUD) equipped with the optical scanning device of FIG. 1 and a part of an automobile.

FIG. 3 is a schematic configuration diagram showing a head-up display (HUD) 1000 equipped with the optical scanning device 200, and a part of an automobile. The HUD 1000 is installed in a dashboard 303 or the like located near the windshield 302 of the automobile 301.

In addition to the optical scanning device 200, the HUD 1000 includes a cold mirror 304, a projection mirror 305 including a concave mirror, a dustproof window 306, and the like. Projection light L3 generated by the optical scanning device 200 enters the windshield 302 of the automobile through the cold mirror 304 and the projection mirror 305, and is reflected by the windshield 302 to an observer (driver) who is a user. Thus, the driver can visually recognize an image or the like projected by the optical scanning device 200 as a virtual image I.

The optical scanning device 200 includes a light emitting device 2, a light deflector 50, a free-form surface mirror 10, an intermediate screen 11, and the like.

Figure 4:
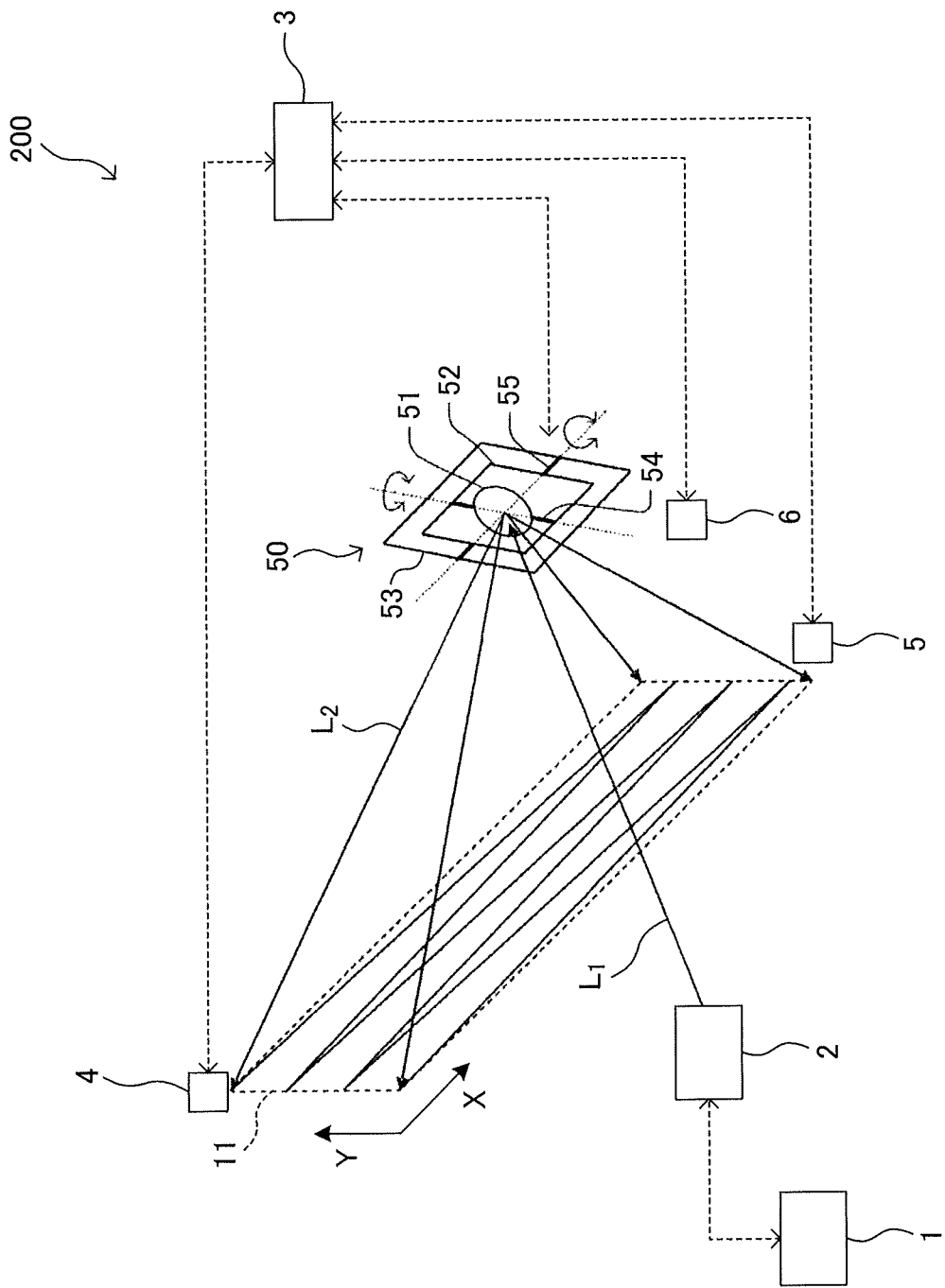
FIG. 4 is a schematic diagram schematically showing an internal configuration of the optical scanning device of FIG. 1.

FIG. 4 is a schematic diagram schematically showing an internal configuration of the optical scanning device 200 according to the present embodiment. In this drawing, all the electric signals are indicated by dotted arrows. For the sake of convenience, drawing of the free-form surface mirror (10 in FIG. 3) is omitted. In the drawing, X represents a main-scanning direction, and Y represents a sub-scanning direction.

In this drawing, a light source controller 1 controls the intensity, lighting timing, waveform, and the like of light emitted from the light emitting device 2. The light source controller 1 is implemented by a central processing unit (CPU) and a control circuit. A light flux L1 is emitted from the light emitting device 2 controlled by the light source controller 1.

Figure 5:
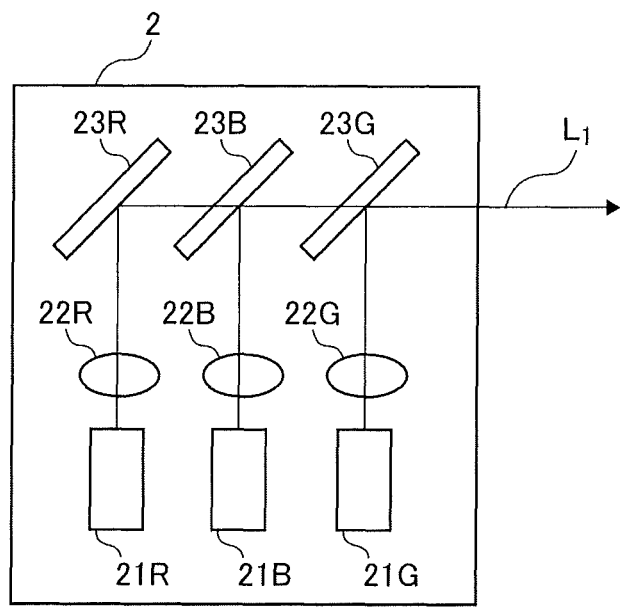
FIG. 5 is an internal configuration diagram of a light emitting device of the optical scanning device of FIG. 1.

FIG. 5 is an internal configuration diagram of the light emitting device 2. The light emitting device 2 has three light sources, that is, a light source 21R for emitting red (R) light, a light source 21B for emitting blue (B) light, and a light source 21G for emitting green (G) light. These light sources include a laser diode. The laser diode is a so-called edge emitting laser and is of a type of semiconductor laser. It should be noted that the suffixes R, B, and G at the end of the numeral codes indicate that the suffixes are members for R, B, and G.

In this embodiment, the light source 21R for R emits R light having a wavelength of 650 [nm]. The light source 21B for B emits B light of 450 [nm]. The light source 21G for G emits G light of 515 [nm].

In addition to the above-described three light sources, the light emitting device 2 also has collimator lenses 22R, 22B, 22G, dichroic mirrors 23R, 23B, 23G, and the like.

The collimator lenses 22R, 22B, 22G convert the R light, the B light, and the G light emitted from the light sources 21R, 21B, 21G into substantially parallel light.

Each of the dichroic mirrors 23R, 23B, 23G is made of a thin film such as a dielectric multilayer film, for example, reflects light of a specific wavelength, and transmits light of other wavelengths.

The dichroic mirror 23R reflects the R light transmitted through the collimator lens 22R toward the dichroic mirror 23B.

The dichroic mirror 23B transmits the R light reflected by the dichroic mirror 23R toward the dichroic mirror 23G. The B light transmitted through the collimator lens 22B is reflected toward the dichroic mirror 23G. The R light reflected by the dichroic mirror 23R and the B light that has transmitted through the collimator lens 22B enter the vicinity of the center of the dichroic mirror 23B.

The dichroic mirror 23G reflects the R light and the B light incident through the dichroic mirror 23B and the G light that has transmitted through the collimator lens 22G toward the outside of the light emitting device 2 (an emitting direction of light from the light emitting device 2). The R light and the B light through the dichroic mirror 23B, and the G light reflected by the collimator lens 22G enter the vicinity of the center of the dichroic mirror 23G.

The R light, the B light, and the G light are combined into one light flux L1. At this time, the color of the combined light is expressed variously by the balance of the intensity of the light sources 21R, 21B, 21G.

In FIG. 4, a single micro electro mechanical systems (MEMS) mirror that vibrates or is driven to rotate two-dimensionally is used as the light deflector 50. However, a light deflector that performs two-dimensionally scanning may be used as the light deflector 50 by combining a plurality of one-dimensional driven mirrors.

A light reflector 51 of the light deflector 50 is held by a first frame member 52. The first frame member 52 is held by a second frame member 53. A rotatable first torsion bar 54 extending in the sub-scanning direction (Y) is attached to the first frame member 52. A rotatable second torsion bar 55 extending in the main-scanning direction is attached to the second frame member 53.

When the first torsion bar 54 rotates about the axial center of the sub-scanning direction (Y), the light reflector 51 swings together with the first frame member 52 around the axial center. By this swinging, a beam spot of the scanning light L2 moves on a surface to be scanned in the main-scanning direction (X). When the second torsion bar 55 rotates about the axial center of the main-scanning direction (X), the light reflector 51 swings together with the first frame member 52 and the second frame member 53 around the axial center. By this swinging, a beam spot of the scanning light L2 moves on a surface to be scanned in the sub-scanning direction (Y). The driving of the light deflector 50 that performs such optical scanning is controlled by a light deflector controller 3. The light deflector controller 3 is implemented by a CPU and a control circuit. In FIG. 4, the light source controller 1 and the light deflector controller 3 are shown as separate devices. However, the light source controller 1 and the light deflector controller 3 may be implemented by the same CPU or control circuit.

The scanning light L2 deflected by the light deflector 50 is scanned in the main-scanning direction (X) and the sub-scanning direction (Y) on the intermediate screen 11 as a surface to be scanned via the free-form surface mirror (10 in FIG. 3).

The scanning light L2 scans at an ultrahigh speed with a high frequency of about 20 to 40 [kHz] in the main-scanning direction. The scanning light L2 scans at a high speed with a low frequency of about several tens Hz in the sub-scanning direction.

The light deflector 50 deflects light so that a first light receiver 4 and a second light receiver 5 located outside the region of the intermediate screen 11 in the main-scanning direction receive light at a predetermined timing. The first light receiver 4 and the second light receiver 5 transmit a light receiving signal to the light deflector controller 3 at the timing of receiving light.

The deflection characteristics of the light deflector 50 fluctuate depending on the environment and the like. For this reason, during the optical scanning, the light deflected by the light deflector 50 is actually detected, and on the basis of the timing, a swing angle of a mirror, a light emission timing of each light source, and the like are corrected to adjust a scanning position or image size. As a result, the scanning position in a forward direction and the scanning position in a backward direction of the scanning light L2 are made to coincide. The first light receiver 4 and the second light receiver 5 are for actually detecting the light deflected by the light deflector 50.

In the main-scanning direction (X) in which the light deflector 50 is resonantly driven, sensitivity to temperature is high, so that the scanning position is adjusted precisely. There is also sensitivity to temperature in the sub-scanning direction (Y), so that the scanning position is adjusted in order to obtain high image quality.

The light deflector controller 3 predicts a characteristic change of the light deflector 50 on the basis of the temperature detection result by a temperature detector 6 provided in the vicinity of the light deflector 50. An input signal to the light deflector 50 is set on the basis of the light receiving signals from the first light receiver 4 and the second light receiver 5 and the temperature information from the temperature detector 6.

Figure 6:
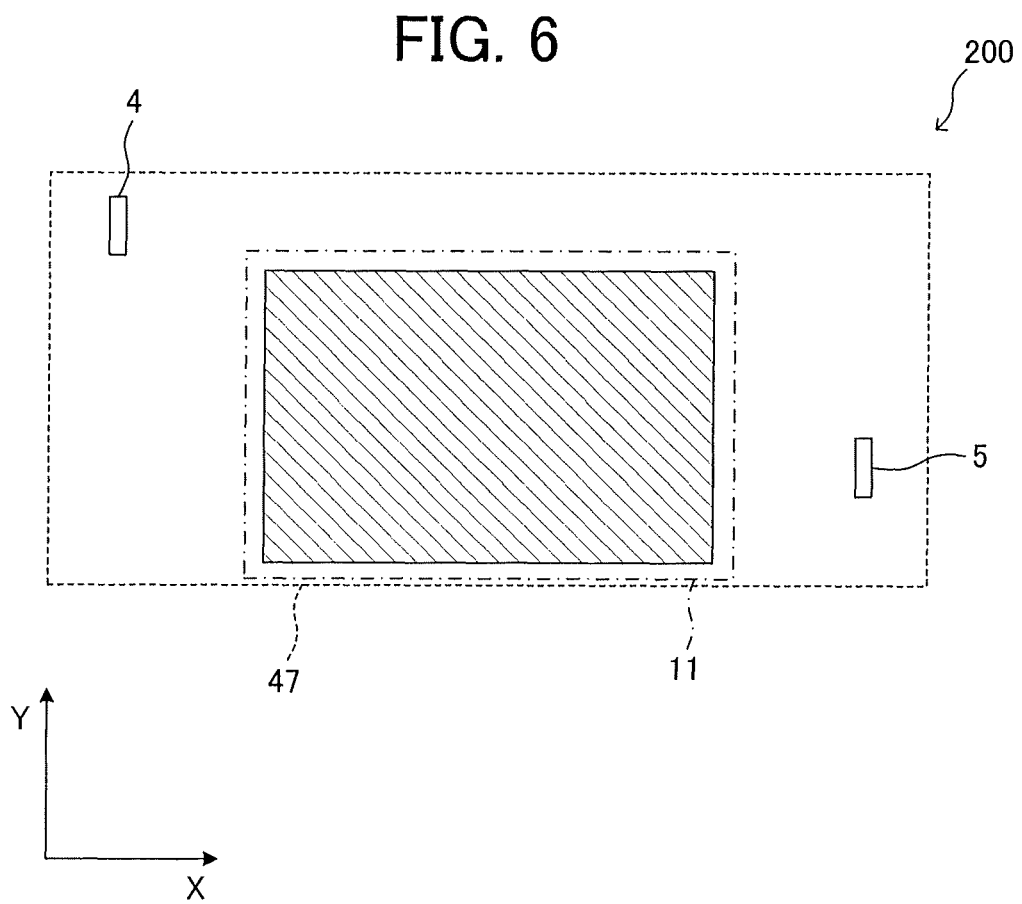
FIG. 6 is a schematic diagram for explaining a positional relationship between each region inside the optical scanning device of FIG. 1 and each light detector.

FIG. 6 is a schematic diagram for explaining a positional relationship between each region inside the optical scanning device 200 and each of the light detectors (4, 5). In this drawing, a deflection region 47 indicates a region where the light deflected by the light deflector (50) reaches. X represents the main-scanning direction, and Y represents the sub-scanning direction.

In this example, the intermediate screen 11 is a rectangular region. However, the intermediate screen 11 is not necessary to have a rectangular shape, and can be minimized according to the figure to be displayed in order to downsize the device.

As shown in the drawing, the first light receiver 4 and the second light receiver 5 are disposed in the region outside the intermediate screen 11 and inside the deflection region 47. The light deflector controller 3 measures the timing at which the light deflection direction by the light deflector 50 becomes outside the intermediate screen 11 and is close to the first light receiver 4 and the second light receiver 5, to turn on any one of the light sources (21R, 21G, 21B) of R, G, B. Thus, the first light receiver 4 and the second light receiver 5 reliably receive light. Hereinafter, the light emitted from the light source that is turned on to cause the first light receiver 4 and the second light receiver 5 to receive light is referred to as signal light.

The light deflector controller 3 calculates the scanning speed in the main-scanning direction (X) and the scanning speed in the sub-scanning direction (Y) on the basis of the time as described below. That is, the scanning speed is the time from when the light receiving signal is transmitted from the first light receiver 4 until the light receiving signal is transmitted from the second light receiver 5, or the time from when the light receiving signal is transmitted from the second light receiver 5 until the light receiving signal is transmitted from the first light receiver 4.

The signal light is not directly emitted from the light emitting device 2 in order to display an image. However, weak diffused light irregularly reflected in the light deflector 50 is mixed as stray light into the scanning light L2 to generate image noise in some cases.

Next, the configuration of the optical scanning device according to the embodiment will be described.

Figure 7:
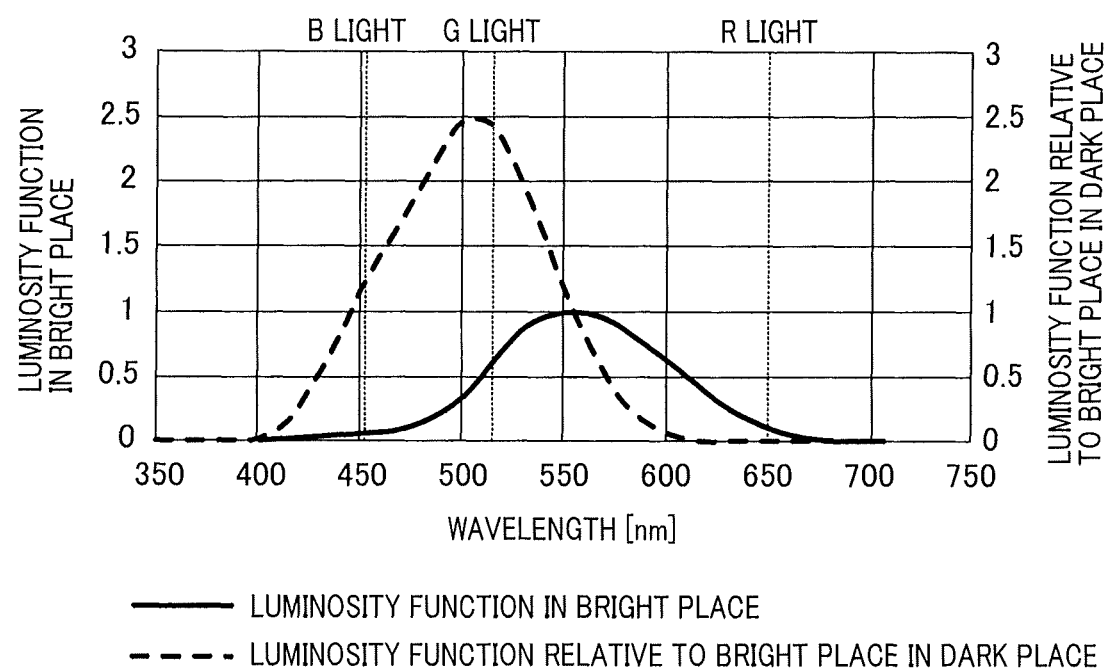
FIG. 7 is an example graph illustrating a relationship between the luminosity function of human eyes and the wavelength of light.

FIG. 7 is a graph showing a relationship between the luminosity function of human eyes and the wavelength of light. The horizontal axis shows the wavelength of the light emitted from the light source. The vertical axis on the left side shows the luminosity function in a bright place felt in a bright place. The vertical axis on the right side shows the luminosity function relative to a bright place in a dark place felt in a dark place. The luminosity function relative to a bright place indicates magnification of the luminosity function in a dark place relative to the luminosity function in a bright place.

As shown in the drawing, with light having a wavelength of 550 [nm] or less, light becomes easier to see in a dark place compared to a bright place. Both the luminosity function relative to a bright place in a dark place and the luminosity function in a bright place have a value close to zero with light having a wavelength of 400 [nm] or less. The value is also close to zero with light having a wavelength exceeding 680 [nm]. However, since light having a wavelength of 400 [nm] or less is not blue, such light cannot be used as B light for image display. Since light having a wavelength exceeding 680 [nm] is not red, such light cannot be used as R light for image display.

In the B light having a wavelength of 450 [nm] emitted from the light source 21B of the optical scanning device 200, the luminosity function in a bright place has a low numerical value, but the luminosity function relative to a bright place in a dark place has a high value. Therefore, when the B light is used as the signal light, image noise tends to be visually recognized in a dark place. In automobiles, although no image noise is visually recognized during daytime driving, image noise is conspicuous in nighttime driving.

In the G light having a wavelength of 515 [nm] emitted from the light source 21G of the optical scanning device 200, both the luminosity function relative to a bright place in a dark place and the luminosity function in a bright place also have a high value. In particular, the luminosity function relative to a bright place in a dark place has almost a peak value. When the G light is used as the signal light, image noise tends to be conspicuous in both a bright place and a dark place.

In the R light having a wavelength of 650 [nm] emitted from the light source 21R of the optical scanning device 200, both the luminosity function relative to a bright place in a dark place and the luminosity function in a bright place have a low value. Therefore, when the R light is used as the signal light, it is possible to make image noise inconspicuous both in a bright place and a dark place.

Therefore, in the case of being used in an automobile, in the optical scanning device 200, the light source 21R is used, and each of the first light receiver 4 and the second light receiver 5 receives signal light including R light. With such a configuration, it is possible to reduce image noise caused by mixing signal light as stray light into the scanning light L2.

The wavelength of the light source with which the signal light is emitted is not limited to 650 [nm]. As shown in the drawing, when the wavelength is 600 [nm] or more, it is possible to make image noise inconspicuous both in a bright place and a dark place.

Light having a wavelength of 600 [nm] or more, with which both the luminosity function in a bright place and the luminosity function relative to a bright place in a dark place have a low value, is used as the light to be received by the light receivers, so that image noise is hard to be visually recognized both in a bright place and a dark place. As a result, it is possible to reduce image noise caused by mixing light, which is to be received by a light receiver, as stray light into a scanning light. However, in a case where the light is used also as the light source of the scanning light L2, it is necessary to select a wavelength of 620 [nm] or more with which light is R light. In order to obtain brightness which does not hinder image display, it is necessary to select a wavelength of 680 [nm] or less. When a wavelength in the range of 620 [nm] to 680 [nm] is selected, the light source 21R for image display can also be used as a light source of signal light. More particularly, while optical scanning is performed with respect to the surface to be scanned (for example, windshield 302) with red light emitted from a light source for image display (for example, R light source) and an image is displayed on the surface to be scanned, the light receivers receive the red light emitted from the light source. When the R light source for image display is used also as a light source for emitting light to be received by the light receivers, cost reduction can be achieved.

Not only in HUDs for automobile but also in general displays and projectors, in order to make image noise inconspicuous in both dark and bright environments, it is desirable that light having a wavelength of 600 [nm] or more is used as signal light.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An optical scanning device, comprising:
a plurality of light sources;
a light deflector configured to scan light emitted from the plurality of light sources at a predetermined timing, the light including first light scanned to an image region and second light scanned outside of the image region, the first light passing through the image region and onto a surface to be scanned;
a first light receiver and a second light receiver each positioned outside of the image region and configured to receive the second light; and
circuitry configured to
adjust a scanning position of the light deflector based on a first time that the first light receiver receives the second light and a second time that the second light receiver receives the second light, and
turn on the at least one light source so that the first light receiver receives the second light at the predetermined timing, wherein
the at least one light source emits light having a wavelength of 600 nm or more.

2. The optical scanning device according to claim 1, wherein the wavelength of 600 nm or more is in a range of from 620 nm to 680 nm.

3. The optical scanning device according to claim 2, wherein
red light is emitted from the at least one light source to optically scan the surface to be scanned to display an image thereon, and
the first light receiver receives the red light emitted from the light source.

4. An image display apparatus, comprising:
the surface to be scanned; and
the optical scanning device according to claim 1, wherein the optical scanning device is configured to display an image on the surface to be scanned.

5. The image display apparatus according to claim 4, wherein the image display apparatus is a head-up display.

6. A movable object mounted with the image display apparatus according to claim 4.

7. The optical scanning device according to claim 1, further comprising a temperature detector that detects a temperature of the light deflector.

8. The optical scanning device according to claim 7, wherein the circuitry is further configured to adjust the scanning position of the light deflector based on temperature information received from the temperature detector, the temperature information indicating the temperature of the light deflector.

9. The optical scanning device according to claim 1, wherein the light deflector further includes a first frame member that rotates about a first axis and a second frame member that rotates about a second axis orthogonal to the first axis.

10. The optical scanning device according to claim 9, wherein the circuitry adjusts the scanning position of the light deflector by controlling the first frame member to rotate about the first axis.

11. The optical scanning device according to claim 9, wherein the circuitry adjusts the scanning position of the light deflector by controlling the second frame member to rotate about the second axis.

12. An apparatus, comprising:
a first light source that emits first light having a wavelength of greater than 600 nm;
a second light source that emits second light;
a light deflector configured to scan the first light and the second light at a predetermined timing, the first light and the second light being scanned through an image region onto an image surface and being scanned outside of the image region;

a first light receiver and a second light receiver each positioned outside of the image region and configured to receive the first light scanned by the light deflector; and circuitry configured to adjust a scanning position of the light deflector based on a first time that the first light receiver receives the first light and a second time that the second light receiver receives the first light, and turn on the first light source so that the first light receiver receives the first light at the predetermined timing.

13. The apparatus according to claim 12, wherein the wavelength of 600 nm or more is in a range of from 620 nm to 680 nm.

14. The apparatus according to claim 12, wherein red light is emitted from the at least one light source to optically scan the surface to be scanned to display an image thereon, and the first light receiver receives the red light emitted from the light source.

15. The apparatus according to claim 12, further comprising a temperature detector that detects a temperature of the light deflector.

16. The optical scanning device according to claim 15, wherein the circuitry is further configured to adjust the scanning position of the light deflector based on temperature information received from the temperature detector, the temperature information indicating the temperature of the light deflector.

17. The optical scanning device according to claim 12, wherein the light deflector further includes a first frame member that rotates about a first axis and a second frame member that rotates about a second axis orthogonal to the first axis.

18. The optical scanning device according to claim 17, wherein the circuitry adjusts the scanning position of the light deflector by controlling the first frame member to rotate about the first axis.

19. The optical scanning device according to claim 17, wherein the circuitry adjusts the scanning position of the light deflector by controlling the second frame member to rotate about the second axis.

20. An image display apparatus, comprising:

the surface; and the optical scanning device according to claim 12, wherein the optical scanning device is configured to display an image on the surface.

* * * * *